United States Patent [19]

Koshizawa

[11] Patent Number: 5,160,971
[45] Date of Patent: Nov. 3, 1992

[54] DISTANCE MEASURING EQUIPMENT FOR A CAR

[75] Inventor: Toshifumi Koshizawa, Ebina, Japan

[73] Assignee: Isuzu Motors Limited, Tokyo, Japan

[21] Appl. No.: 766,134

[22] Filed: Sep. 27, 1991

[30] Foreign Application Priority Data

Sep. 28, 1990 [JP] Japan .................................. 2-262664

[51] Int. Cl.⁵ .............................................. G01N 21/00
[52] U.S. Cl. .............................................. 356/5; 342/72
[58] Field of Search ........................ 356/5; 342/70, 72

[56] References Cited

U.S. PATENT DOCUMENTS

| 4,757,450 | 7/1988 | Etoh | 342/70 X |
| 4,867,561 | 9/1989 | Fujii et al. | 356/237 |
| 4,931,767 | 6/1990 | Albrecht et al. | 356/342 |

Primary Examiner—Mark Hellner
Attorney, Agent, or Firm—Staas & Halsey

[57] ABSTRACT

Distance measuring equipment for a car arranged such that a wiper is driven only when a light reflection condition of a non-reflecting protective glass is detected with the light input/output to the glass. Additionally, it can be arranged such that the measuring operation is interrupted only when a driving angle of the wiper resides in a predetermined measuring angle range on the protective glass.

5 Claims, 3 Drawing Sheets

DISTANCE MEASURING EQUIPMENT FOR A CAR

BACKGROUND OF THE INVENTION

The present invention relates to distance measuring equipment for a car, and in particular to distance measuring equipment for a car with optical measuring means to measure a distance between an observing car and a forward or backward obstacle or object.

The following systems have required distance measuring equipment (DME) for measuring a distance between an observing car in which a measuring operator rides and a forward or backward obstacle on the basis of the time elapsed from the time of the emission of laser light to the time of the reception of the laser light reflected by the obstacle, by optical measuring means such as a laser radar:

(1) Systems for warning of a collision such as a rear-end collision by the detection of a relative speed and distance between an observing car and a forward obstacle (car);

(2) Systems for automatically operating a brake in order to prevent a collision such as a rear-end collision by the detection of a relative speed and distance between an observing car and a forward obstacle (car);

(3) Systems for automatically operating a steering gear or a brake in order to prevent a collision such as a rear-end collision by the detection of a relative speed, distance, position between an observing car and a forward obstacle (car), and a road condition.

The optical measuring means used for such distance measuring equipment comprises one provided outside a car and the other provided within a car. In the former, raindrops in case of rain or dust adheres to the surface of a lens, so that the interruption or diffusion of the input/output light occurs, causing the detecting range thereof to be narrowed or distorted. This also brings about mismeasurements leading to the deterioration in performance. Also, since the optical measuring means per se is exposed to raindrops or dust, its mechanical or electrical performance is easily deteriorated, resulting in a short life.

Thus, the latter optical measuring means provided within a car is preferrable to the former one provided outside a car.

However, in this case, raindrops or dust which adheres to a protective glass (front or rear glass) for a car must to be removed from the glass.

Such prior art equipment is disclosed in Japanese Utility Model Application Laid-open Nos. 60-76280 and 60-109064. The former prior art is provided with a washing nozzle and a wiper in a window for the emission of laser light and a window for the reception of the light reflected from the obstacle. The latter prior art actuates a washing unit subsequent to a predetermined operation of light emission of a laser unit.

However, since such prior art equipment starts to operate the wiper manually, it is disadvantageous in that it is troublesome to an operator and it is not adequate for such a system that automatically operates the distance measuring equipment.

It is also diadvantageous that the wiper disturbs the laser light of the optical measuring means so that without any modification, some errors will arise in the measured data.

SUMMARY OF THE INVENTION

Accordingly, it is an object of the present invention to provide distance measuring equipment for a car which is capable of automatically removing raindrops or dust from a protective glass for a car by a wiper without measurement errors in the presence of the wiper.

For the achievement of the above noted object, the distance measuring equipment for a car according to the present invention comprises: first means provided inside the car for optically measuring a distance between an observing car and one of forward and backward obstacles; second means for optically detecting a condition where a non-reflecting protective glass having outside a wiper reflects light; and, third means for driving said wiper in response to the output of said second means upon the detection of said reflection.

In the present invention, the protective glass normally transmits light therethrough without any reflection if the glass is clear.

However, if raindrops or dust adhere to the protective glass, the light is reflected at the glass so that such a light refecting condition is detected by the second means, which drives the third means thereby to operate the wiper.

Therefore, if something adheres to the protective glass, the wiper cleans up the protective glass so that the output or input light of the first means is not interrupted or diffused, so that a normal optical measurement of a distance between an observing car and a forward or backward obstacle, can be obtained.

In this case, the second means may be provided to transmit light to the protective glass and receive the light reflected from the protective glass.

In addition to the above arrangement, the distance measuring equipment for a car according to the present invention may further comprise fourth means for detecting a driving angle of said third means; and, fifth means for interrupting the operation of said first means only when said driving angle of said third means resides within a range of a predetermined measuring angle of said first means.

According to this arrangement, when the driving angle of the third means detected by the fourth means resides within a range of a predetermined measuring angle of the first means, the fifth means interrupts the measuring operation of the first means.

Thus, as shown in FIG. 2, when the wiper resides outside a range of a predetermined measuring angle $\beta_1-\beta_2$ defining a measuring region A of the first means on the protective glass, the optical measuring process is made as usual.

On the other hand, however, when it is found that the wiper resides within the predetermined measuring angle range $\beta_1-\beta_2$, the operation of the first means is interrupted.

Thus, even when the wiper starts to operate as noted above, the first means is not operated, so that no mismeasurement due to the wiper is obtained.

BRIEF DESCRIPTION OF THE DRAWINGS

The present invention will now be more apparent to those skilled in the art from the attached drawings in which.

DETAILED DESCRIPTION OF THE PREFERRED EMBODIMENT

Hereinafter, an embodiment of distance measuring equipment for a car according to the present invention wil be described.

Figure 1:
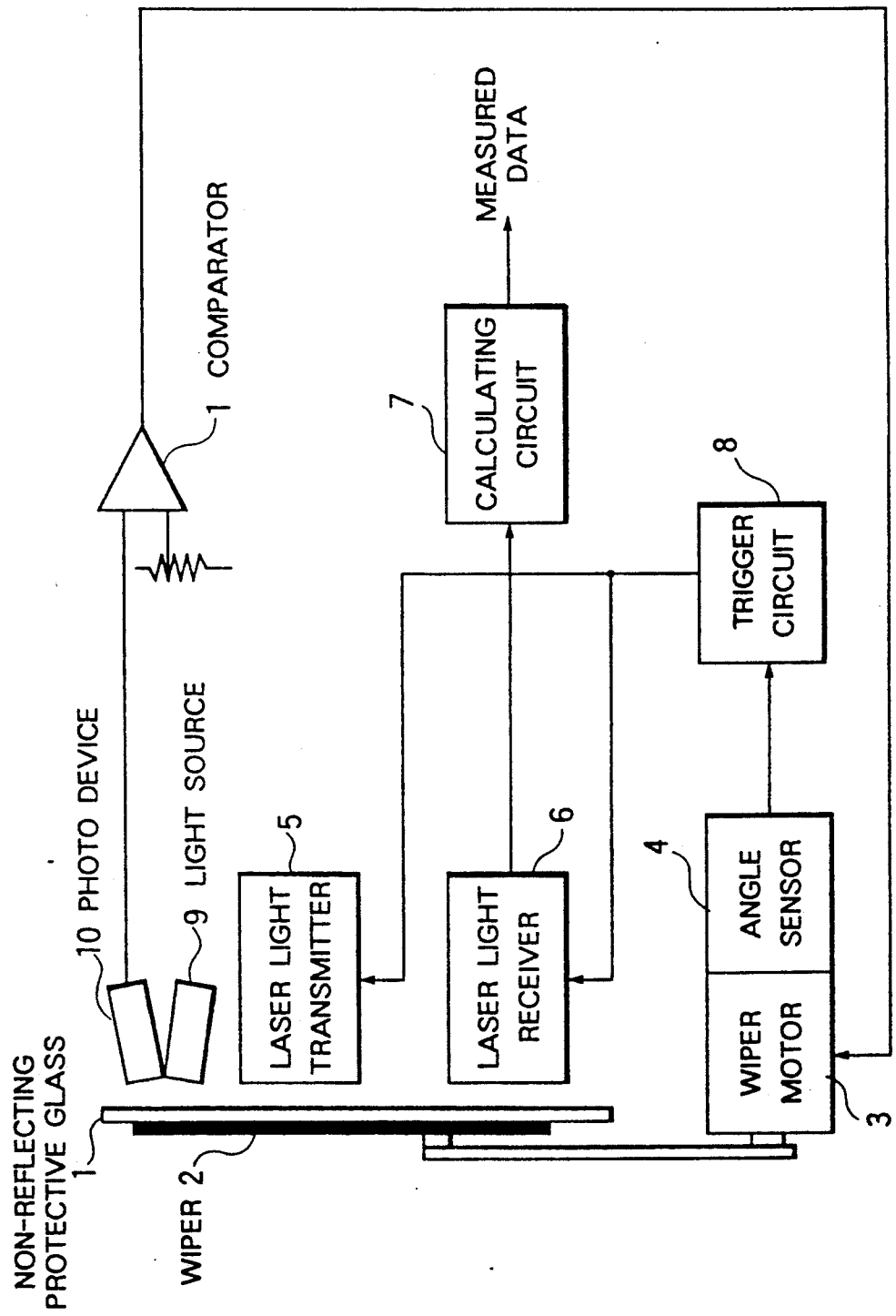
FIG. 1 is a block diagram of a schematic arrangement of one embodiment of distance measuring equipment for a car according to the present invention.

FIG. 1 is a block diagram illustrating the arrangement of one embodiment of distance measuring equipment according to the present invention, in which a non-reflecting protective glass 1 forms a front window (or a rear window under some circumstances) of a car (not shown), a wiper 2 is provided outside the glass 1 to clean up raindrops or dust which adhere to the protective glass 1, a wiper motor 3 is connected to the wiper 2 as means for driving the wiper 2, and an angle sensor 4 is provided for detecting the driving angle of the wiper motor 3.

Also, a laser light transmitter 5 having a driving circuit trasmits laser light toward an obstacle (car) through the protective glass 1 and a laser light receiver 6 having a timer circuit is positioned to receive the laser light reflected at the obstacle. The laser light receiver 6 is connected to a calculating circuit 7 for calculating a distance from an observing car in which this equipment is installed to a measured object, i.e. a forward or backward obstacle. It is to be noted that the laser light transmitter 5, the laser light receiver 6, and the calculating circuit 7 form well-known optical measuring means provided inside the car.

A trigger circuit 8 is provided as means for generating a control signal for driving or interrupting the laser light transmitter 5 and the laser light receiver 6 with reference to the output signal of the angle sensor 4.

Moreover, there are provided inside the car a light source 9, a photo device 10 for receiving a reflected light of the light output from the light source 9, and a comparator 11 which compares the output of the photo device 10 with a reference level to provide the wiper motor 3 with a control signal indicating whether or not the operation of the wiper 2 is necessary. It is to be noted that the light source 9, the photo device 10, and the comparator 11 form means for optically detecting a condition where the protective glass 1 reflects light.

Figure 2:
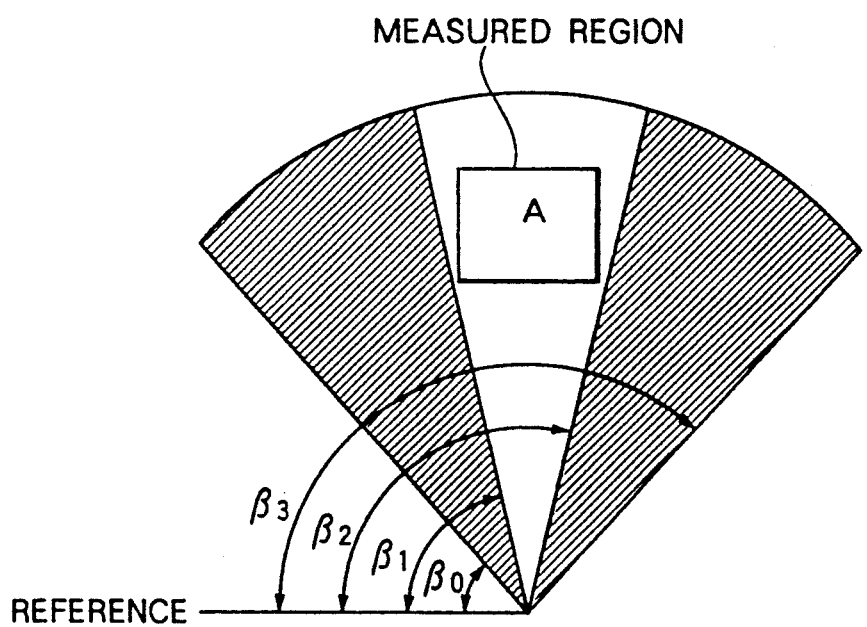
FIG. 2 is a graph showing a functional relationship between the operation of a wiper and the measuring angle range of an optical measuring means used for the present invention; and, FIG. 3 is a flow chart illustrating the algorithm of a trigger circuit used for the present invention.
Figure 3:
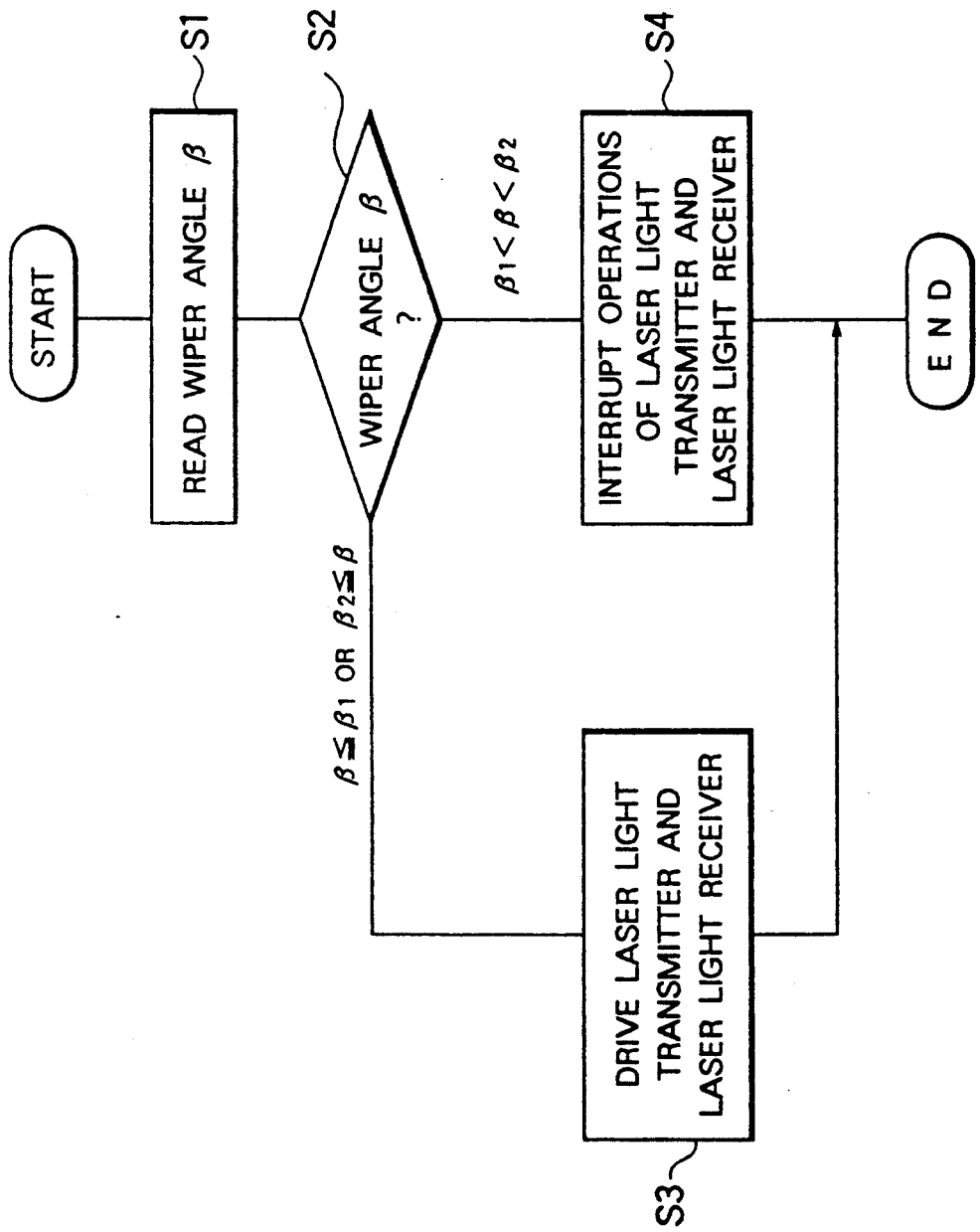

Next, the operation of the above embodiment for a car will be described hereinafter with reference to FIG. 2 showing a functional relationship between the operation of a wiper and the measuring angle range of an optical measuring means and FIG. 3 showing the operation algorithm of the trigger circuit 8.

Now, if no rain drops or dust adhere to the protective glass 1 so that the protective glass 1 presents its own non-reflecting characteristic, light output from the light source 9 is not reflected at the protective glass 1 but is released outside the car, so that the photo device 10 has no reflected light as an input. Therefore, the input to the comparator 11 is correspondingly at such a low level that it does not exceed the comparable reference level, so that the output of the comparator 11 is at "L" (low) level and the wiper motor 3.

In the meantime, a well-known optical measurement is carried out such that a time interval from the time a laser pulse is emitted from the laser light transmitter 5 to the time the light reflected from a forward or backward obstacle is returned and detected by the laser light receiver 6 is provided for the calculating circuit 7 which calculates a distance between this observing car and the obstacle from the time interval.

On the other hand, if raindrops or dust etc. adhere to the protective glass 1, the output light from the light source 9 is reflected at the protective glass 1. Therefore, the output level of the photo device 10 becomes so high that it exceeds the reference level of the comparator 11 so that the output level of the comparator 11 becomes "H" (high) level.

Therefore, the wiper motor 3 which is responsive to the output of the comparator 11, drives the wiper 2 while the output level of the comparator 11 is "H".

Thus, only if the protective glass 1 becomes dirty so that the cleaning operation of the wiper 2 is needed, the protective glass 1 can be restored to a clean, non-reflecting condition, thereby enabling a normal optical distance measurement to be done.

Even with such an operation, the wiper 2 might disturb the output light from the laser light transmitter 5 so that a normal optical measurement can not be carried out and errors are produced in the measured data.

Thereupon, in such a condition that the wiper 2 is driven by the wiper motor 4, a driving angle $\beta$ of the wiper motor 3 is detected by the angle sensor 4 and provided for the trigger circuit 8, as shown at Step S1 in FIG. 3.

The trigger circuit 8 determines whether or not the driving angle $\beta$ resides in a predetermined measuring angle range of the optical measuring means, namely, the angle range $\beta_1$–$\beta_2$ which sandwiches a measuring region A shown in FIG. 2 where the output light of the laser light transmitter 5 is irradiated on the protective glass 1, as shown at Step S2 in FIG. 3. It should be noted that the angle range $\beta_1$–$\beta_2$ can be preset in a memory (not shown) in the trigger circuit 8 so as to correspond to the measuring region A.

As a result of this determination, if the driving angle $\beta$ resides in the angle range ($\beta_0 < \beta \leq \beta_1$ or $\beta_2 < \beta \leq \beta_3$) shown by oblique lines in FIG. 2, which means the condition that the measuring region A is not disturbed by the wiper 2, the trigger circuit 8 drives (triggers) the laser light transmitter 5 and the laser light receiver 6 to carry out a normal measurement, as shown at Step S3 in FIG. 3.

If the driving angle $\beta$ resides in the angle range ($\beta_1 < \beta < \beta_2$) other than the oblique portion in FIG. 2, the measurement in the region A will be disturbed by the wiper 2 without any modification.

Therefore, in this invention, the trigger circuit 8 interrupts the operations of the laser light transmitter 5 and the laser light receiver 6, as shown at Step S4 in FIG. 3, when the wiper 2 resides in the predetermined measuring angle range $\beta_1 < \beta < \beta_2$.

Namely, only when the wiper 2 resides in a range other than the predetermined measuring angle range $\beta_1 < \beta < \beta_2$, a normal distance measuring operation is carried out.

As mentioned above, since distance measuring equipment for a car according to the present invention is arranged such that a wiper is driven only when a light reflection condition of a non-reflecting protective glass is detected with the light input/output to the glass, the optical measuring range subject to the dirt of raindrops or dust on the protective glass can be kept wide at all times, resulting in the prevention of distortion or the deterioration of measurements.

Also, since the present invention can be arranged such that the measuring operation of the optical measuring means is interrupted only when the driving angle of the wiper resides in a predetermined measuring angle range, measuring errors potentially generated when the wiper passes in front of the pretection glass are avoided, resulting in an improved resistance to environmental problems in regard to performance required for a car.

While a number of alternatives and modifications have been discussed above, it will be appreciated that the invention encompasses all forms and variations within the scope of the appended claims.

We claim:

1. Distance measuring equipment for a car having a non-reflecting protective glass with a wiper outside the car comprising:

first means provided inside the car for optically measuring a distance between the car and one of obstacles forward or backward of the car;

second means for optically detecting a condition where the non-reflecting protective glass reflects light and for providing an output;

third means for driving the wiper in response to the output of said second means upon the detection of the reflection condition fourth means for detecting a driving angle of said third means; and fifth means for interrupting the operation of said first means only when the driving angle of said third means resides within a range of a predetermined measuring angle of said first means.

2. Distance measuring equipment for a car according to claim 1, wherein said second means includes means for transmitting light to the glass and means for receiving the light reflected from the glass.

3. Distance measuring equipment for a vehicle having a window and a wiper for wiping the window, comprising:

first means, postioned inside the vehicle, for optically measuring a distance between the vehicle and an obstacle, through the window;

second means for determining a position of the wiper with respect to the window when the wiper is moving; and third means for interrupting the operation of said first means based on the position of the wiper determined by said second means.

4. A distance measuring method for use in a vehicle having a window and a wiper for wiping the window, comprising steps of:

(a) operating optical measuring equipment to measure a distance between the vehicle and an obstacle;

(b) driving the wiper;

(c) determining a position of the wiper on the window; and (d) interrupting the operation of the optical measuring equipment based on the determined position of the wiper.

5. Distance measuring equipment for a vehicle having a window with a wiper for wiping the window, comprising:

optical measurement apparatus to measure a distance between the vehicle and an obstacle outside the vehicle;

a sensor to detect a position of the wiper with respect to the window when the wiper is moving and generate an output signal; and a trigger circuit, coupled to said optical measurement apparatus and said sensor, to disable the operation of said optical measurement apparatus based on the output signal of said sensor.

* * * * *

UNITED STATES PATENT AND TRADEMARK OFFICE
CERTIFICATE OF CORRECTION

PATENT NO. : 5,160,971

DATED : NOVEMBER 3, 1992

INVENTOR(S) : TOSHIFUMI KOSHIZAWA

It is certified that error appears in the above-identified patent and that said Letters Patent is hereby corrected as shown below:

Col. 2, line 51, "$B_1-B_2$" should be --$B_1 \sim B_2$--;
line 56, "$B_1-B_2$" should be --$B_1 \sim B_2$--.

Col. 3, line 65, "3." should be --3 is not driven.--.

Col. 4, line 34, "$B_1-B_2$" should be --$B_1 \sim B_2$--;
line 38, "$B_1-B_2$" should be --$B_1 \sim B_2$--.

Signed and Sealed this

Twenty-sixth Day of October, 1993

Attest:

BRUCE LEHMAN

Attesting Officer

Commissioner of Patents and Trademarks